Figure 1:
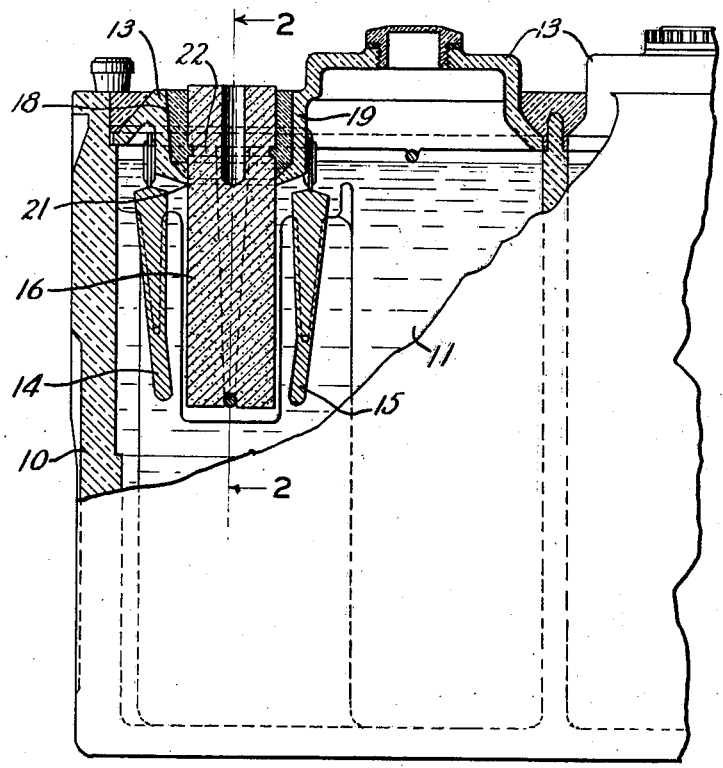

July 16, 1940.   E. A. SCHUMACHER ET AL   2,207,763
AIR DEPOLARIZED CELL AND ELECTRODE THEREFOR
Filed June 27, 1936

INVENTORS
ERWIN A. SCHUMACHER
GEORGE W. HEISE
BY
ATTORNEY

Patented July 16, 1940

2,207,763

UNITED STATES PATENT OFFICE 2,207,763

AIR DEPOLARIZED CELL AND ELECTRODE THEREFOR

Erwin A. Schumacher, Lakewood, and George W. Heise, Rocky River, Ohio, assignors to National Carbon Company, Inc., a corporation of New York Application June 27, 1936, Serial No. 87,626

11 Claims. (Cl. 136—136)

This invention relates to primary galvanic cells of the type which are provided with an air pervious electrode through which air passes to depolarize the electrode. Such cells may have a metallic anode (e. g. zinc), a porous carbon cathode and a caustic soda electrolyte and may be of the delayed action type in which the cells are completely assembled during manufacture, and rendered active upon the addition of water. The invention especially relates to an improved porous carbon electrode and to modifications to the shape of the electrode whereby improved capacities for the cell are obtained.

The electrodes are commonly made of carbon which is shaped into blocks and baked under certain conditions whereby desirable qualities with respect to air depolarization are secured. The electrode is then impregnated with suitable materials whereby it is rendered impervious or substantially impervious to caustic electrolyte although it remains pervious to air. (See for example our U. S. Patent No. 2,017,280, October 15, 1935.)

The electrode is lighter than the electrolyte and tends to float therein. For this reason it is common practice to provide a shoulder on the electrode to hold it in place. Moreover, the electrode must be held in position and sealed to prevent the flow of air into the cell especially before activation. This seal surrounds the carbon electrode and is applied in a fluid condition. This may cause difficulty in commercial manufacture, because of the tendency for the seal to penetrate the electrode. Moreover, the electrode cannot be made entirely impervious to the electrolyte without unduly reducing its permeability to air or its depolarizing activity. Hence it may be desirable to supplement the impregnating material in positions of greatest tendency to wetting.

Furthermore, the shorter the distance which air has to flow through the carbon the less resistance there will be to such flow of air and the greater the rate of depolarization. It is an object of our invention to provide an electrode so shaped that the length of air passage shall be shortened as much as possible. It is a further object to treat the surface of the electrode in such a manner that resistance to liquid penetration and creepage is imparted without substantial interference with the "breather" action. Another object of our invention is to reduce the creepage of the electrolyte and to prevent abnormal wetting of the protected parts of the electrode. A still further object of our invention is to render harmless a moderate penetration of plastic seal into the emergent portion of the electrode.

Figure 2:
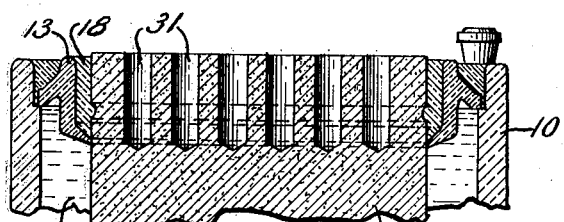
Figure 3:
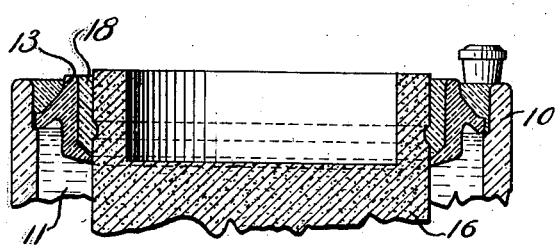

These and other objects of our invention will be evident from the following specification having reference to the accompanying drawing in which Figure 1 is a partial section of a battery illustrating one embodiment of our invention, Figure 2 is a section of the electrode and surrounding parts of one cell taken on line 2—2 of Figure 1 and Figure 3 is a similar view showing another embodiment illustrating a modification of our invention.

The drawing shows a cell consisting of an outer container 10 composed of a suitable plastic material which is resistant to the action of the caustic soda or other electrolyte material 11. The cell is closed by a suitable cover 13 and is provided with electrodes 14 and 15 which are preferably made of zinc and an electrode 16 which is made of porous carbon impregnated to such an extent that it is permeable to air, but impermeable to the electrolyte. The cover 13 is provided with a well 19 in which the electrode 16 is held by suitable sealing material 18. The electrode 16 is provided with a shoulder 21 which bears against the lower edge of the well 19 and prevents the carbon electrode from floating upwardly in the electrolyte. The electrode 16 is provided with a groove 22 in which the sealing material 18 engages to prevent creepage of electrolyte-forming material up through the space between the electrode and the seal. The electrode is also provided with a number of cavities or holes 31 to aid in the "breathing" action, i. e. the action of depolarization by air which passes through the electrode to the inner surfaces thereof on which hydrogen is formed by the electrolytic action. The oxygen of the air reacts with the hydrogen to depolarize the cell.

In general we prefer to employ a plurality of openings as shown in Figure 2 instead of a single opening as shown in Figure 3. The advantages of a plurality of openings include greater conductivity of the finished block and the ability of an electrode to continue functioning when one or more (but not all) of the wells is filled whereas an electrode with one large hole would become completely inoperative if leakage should occur.

The use of ventilating holes or cavities to facilitate gas access to the porous electrode 16 causes marked increase in activity. This is demonstrated by the ability to operate at high current density without serious polarization. If electrodes are not carefully made and the holes properly placed, any imperfections of the electrode, such as physical inequalities of the carbon stock, non-uniformity of impregnation or small cracks may limit the usefulness of such "ventilation" by permitting penetration of the electrolyte into the holes and thus reducing or even destroying the electrode activity. In our invention we have overcome these defects of "ventilated" electrodes and have found that this ventilation cooperates with certain other features of the electrodes to give increased or enhanced service characteristics and decreased rate of deterioration.

It is evident that the improvement in performance characteristics due to the provision of ventilating holes will be dependent in degree upon the number, shape, size and depth of the holes. As a general rule however the efficacy of the larger and deeper holes may be offset, to some extent at least, by a greater tendency toward leakage, resulting in accumulation of electrolyte in the holes and at times in creepage over the breathing walls. Therefore with certain types of electrode material it is desirable to limit the depth of the holes to a depth not substantially below the electrolyte level in the battery as finally assembled and activated for use or, at any event, not below the level at which electrolyte is in contact with the electrode. With many types of electrode stock the use of holes extending to this depth will increase the life of the battery without undue sacrifice of the advantages of ventilation. By way of illustration we have found that for electrodes 4.5 inches square by 1.25 inches thick with one of the ends (4.5 inches by 1.25 inches) exposed to the air, six equally spaced holes ⅜ inch in diameter and about one inch deep are satisfactory. However, our invention is not limited to any particular size or shape of holes and deeper or wider holes may be used or even electrode such as that shown in Figure 3 may be employed.

Due to the fact that variations may exist in the electrode stock it is not possible to make precise and exact comparisons between electrodes having ventilating cavities and those having no such cavities. However, the following test data are believed to be typical as indicative of the effect of the depth of the ventilating holes on operating voltage in commercial air depolarized cells which have been drained at 0.75 ampere to approximately two-thirds exhaustion of zinc and electrolyte content. The data were obtained by testing cells provided with electrodes having, respectively, no ventilating holes and six holes ⅜ of an inch in diameter and of the depth set forth.

| Depth of hole in inches | Discharge voltage at 600 hours |
|---|---|
| 0 | 1.10 |
| 1.0 | 1.13 |
| 1.6 | 1.14 |
| 3.5 | 1.15 |

It may be further noted that the voltage recorded for batteries having holes one inch deep was the same as that obtained with an unventilated electrode operated at a drain of only 0.65 ampere after the same service discharge. Thus it will be observed that the ventilated electrode with holes one inch deep was capable of operating at a drain 0.1 ampere greater than the one without ventilating holes.

To prevent creepage of electrolyte up the emergent electrode walls, these may be coated with suitable electrolyte-resistant plastic or the carbon electrodes themselves may be sealed into a suitable protecting well as shown in the drawing. However, even under the latter conditions there is a tendency for the carbon at the lower edge of the protected area to show an abnormal wetting extending inwardly and upwardly and constricting the cross section of the electrode available for "breather" action thus causing serious deterioration of the electrode. We have found that this evil may be ameliorated by suitable treatment, such for example, as by spraying the electrode at or near the threatened area with certain materials, usually oily in character. A wide variety of materials have this effect notably kerosene, light paraffin oils, turpentine, nitrobenzene, azoxybenzene or even fish oils. Although their exact function is not known, it is possible that they are more highly sorbed by the carbon than water and thus resist or inhibit to some extent the accumulation of moisture, by condensation or otherwise, which causes the wetting action.

This treatment is an addition to and not a substitute for the ordinary impregnation or treatment to render the electrode substantially electrolyte repellent and must not be confused with the latter. Thus for example, treatment with kerosene alone does not adequately water-proof an electrode unless concentrations are used which destroy the depolarizing activity or at least reduce the latter below commercially acceptable limits. Furthermore, the addition of the treating materials to the impregnating solution do not give the desirable result attained by the local treatment after impregnation. When a previously water-proofed or impregnated electrode, such as an electrode impregnated in the manner disclosed by our U. S. Patent No. 2,017,280 of October 15, 1935, is sprayed with kerosene, much greater concentrations than would be permissible in general in impregnating compositions can be maintained at the selected portions without serious impairment of depolarizing activity.

In using this treatment with unventilated electrodes it would be possible to apply the kerosene or other treating material in the form of a fine spray to the carbon surface ordinarily exposed to air and to depend upon the diffusion of the added treating material into the electrode block to reach the portions to be protected. The effect depends on the amount of addition agent or treating material and to some extent on the quality of the carbon. For an electrode of the size previously designated we prefer to use from 2 to 5 cc. of addition material for each electrode; though we have obtained noticeably beneficial effects with as little as 0.5 cc. per electrode and amounts above 5 cc. gave further improvement. Thus we have found that the beneficial effect on spraying increases with quantity; but above about 5 cc. this may be offset by a reduction in breathing or ventilating capacity. Hence a balance must be secured depending on various factors, such as physical structure of electrodes and especially on service requirements. If an air depolarized cell of the present construction and carbon material were to be used on heavy drains it might not be desirable to exceed additions of more than 6 cc. per electrode of the treating agent, although for low drain service this amount might be greatly exceeded.

The above amounts of treating agents are for use in connection with kerosene but with other treating or addition materials different results are secured. We have found that turpentine has about the same protective action as an equal volume of kerosene, yet it interferes less with electrode operation. Thus it is possible to use perhaps 25 percent more turpentine than kerosene with the same effect on operating voltages, and with corresponding benefit in prevention of wetting. It is possible that the superiority of turpentine over kerosene may be associated with its ability to absorb oxygen. Nitrobenzene and azoxybenzene show a protective action which is considerably less than that of kerosene; but these materials interfere less with the breathing or depolarizing function of the electrode. This may be due to their entering into the reaction by alternate reduction and oxidation. Whatever the explanation may be, it has been found possible to mix these materials with another, such as kerosene, permitting the use of greater quantities of material and effective enhance protection of the carbon electrode with better operating voltages or increased drain. We have secured excellent results with the addition to electrodes of the size and type above described of 6 cc. of a mixture of equal parts of kerosene and nitrobenzene.

While such treatment is of great advantage in connection with unventilated electrodes, it is of peculiar importance when used with the herein-disclosed ventilated electrodes. Difficulty of applying the materials whereby they will reach the threaded portions of the electrode is largely offset since the ventilated electrodes afford direct access to these parts. Consequently it is possible to achieve the same protection with smaller additions, thus minimizing interference with breather action; on the other hand larger quantities can be used without impairing operating quality, thus increasing the degree of protection.

The treating material may also be applied at or near the threatened area, i. e. on the active electrode surface, near, or slightly above the electrolyte level. Such treatment might facilitate penetration of plastic seal (18) into the porous carbon itself. This would tend to restrict the cross section of the breathing electrode. With ventilated electrodes such penetration is much less serious than with unventilated electrodes, since in the former this breathing takes place largely through the holes.

Hitherto considerable difficulties have been encountered due to creepage of the electrolyte over the portions of the carbon electrode above the surface of the electrolyte. To avoid this plastic coatings or combinations of a collar and a seal have been used in an attempt to avoid creepage, but even these are effective only when there is an adequate bond of the coating or the seal to the carbon electrode. It has been proposed to strengthen this bond and to prevent creepage to a greater degree by the use of plastic coatings which penetrate into the carbon itself, or the carbon electrode may be provided with laterally cut grooves to intercept the upward travel of the electrolyte. However, both of these expedients reduce the cross section of the electrode at the most critical point and their applicability is correspondingly limited. With ventilated carbons on the other hand the greater portion of the breathing action takes place through the ventilating holes. Accordingly, seals or coatings can be used which penetrate more deeply than would be permissible with unventilated electrodes. While the optimum depth of penetration is dependent upon a number of factors, yet for an average commercial electrode of the type and dimensions previously described, penetrations of ⅛ inch may be used. Such a penetration reduces the cross section 20% to 25%, and would seriously hamper electrode action with respect to air depolarization of unventilated electrodes.

Larger ventilating holes improve operating quality but, as already pointed out, their extension beneath the liquid level involves the danger of liquid infiltration. A leak of any size soon permits filling of the holes and renders an electrode inoperative. Even a slight leak, however, or the accumulation of only small quantities of liquid in the openings, may lead to serious consequences, since creepage usually occurs, spreading over the exposed surface, and effectually preventing air access. To avoid this difficulty, we may cover the portions of the electrode not in contact with electrolyte, and specifically the walls of the ventilating wells, with a medium usually more viscous than that used in the impregnating treatments previously described but substantially less viscous than the seals or coatings described in the preceding paragraph, which penetrates to comparatively slight depth, say of the order of $\frac{1}{16}$ to $\frac{3}{32}$ of an inch, though considerable variation in penetration is permissible depending upon the size of the electrodes. We have found that rubber solutions or dispersions are particularly efficacious under these conditions. As an example we may use the product described in lines 17 to 24 of the second column of page 1 of our Patent 2,017,280. This product contains from 17% to 18% of rubber in a very high state of dispersion. The product is commercially available under the designation "Goodrich Acid Seal Paint No. 1023." This is diluted with about half of its own volume of benzene to form a liquid of the proper consistency for surface treatment. It will be noted that such a solution has about ten times the concentration found satisfactory for ordinary impregnation as described in our above-identified patent. The more concentrated solution just described is unsuited for use in ordinary impregnation. As is the case with ordinary impregnation, a small amount of oil, for example 40% by weight of the dissolved rubber, may be added to the solution. This coating may be applied in a variety of ways as by painting, spraying, dipping or by successively filling and emptying the holes in the electrode. The solvent is subsequently removed by heating.

Instead of the solution of rubber we may use a solution of paraffine in benzene. Using a 20% solution of paraffine in benzene to treat the surface of the electrode exposed to air, followed by a heating to remove the solvent, we obtained the following results in an air depolarized zinc-caustic soda cell under continuous loads of 7.5 amperes per square foot of cathode surface. A waterproofed surface treated carbon electrode was still operating in a satisfactory manner without apparent deterioration after 600 ampere hours of service. A regular waterproofed carbon electrode not surface treated, used as a control, gave a life of 400 ampere hours at which time creepage from a very slight leak had covered about one-third the breathing surface.

The surface treatment of carbon electrodes as above described may be applied to other than ventilated types of carbon electrodes, such as those in which only one side is exposed to electrolyte.

We claim:

1. In a cell comprising a container, a liquid electrolyte in said container, an anode in said electrolyte, an electrolyte-repellent porous carbon cathode impregnated with material to render it substantially repellent to electrolyte but not impervious to air and so supported by the container as to be partially submerged in said electrolyte and to have an emergent portion exposed to the air, and an electrolyte-resistant plastic seal on said emergent portion, the improvement which comprises a light oily liquid material, in the body of said cathode adjacent the seal, said material being more highly sorbed by the carbon than water and being inert to caustic, the amount of such material being sufficient to inhibit preferential wetting of the carbon in the neigborhood of the seal, and being substantially greater in the neighborhood of the seal than in said submerged portion.

2. In a cell comprising a container, a caustic alkali electrolyte solution in said container, an anode in said electrolyte, an air-depolarized electrolyte-repellent porous carbon cathode impregnated with material to render it substantially repellent to electrolyte but not impervious to air and so supported by the container as to be partially submerged in said electrolyte and to have an emergent portion exposed to the air, and an electrolyte-resistant plastic seal on said emergent portion, the improvement which comprises one or more oily liquid materials selected from the group kerosene, light paraffin oils, turpentine, fish oils, nitrobenzene, and azoxybenzene, in the body of the porous cathode only adjacent the seal, the amount of such material being sufficient to inhibit preferential wetting of the carbon in the neighborhood of the seal and being substantially greater in the neighborhood of the seal than in submerged portion.

3. An electrode for an air depolarized cell comprising a block of porous carbonaceous material adapted to be held in said cell by a thermoplastic seal, said block being impregnated with material to render it substantially repellent to caustic alkali electrolyte but not impervious to air, portions of said block adjacent said seal and designed to contact with atmospheric air being treated by spraying with one or more compounds selected from the group consisting of kerosene, light paraffin oils, turpentine, fish oils, nitrobenzene and azoxybenzene.

4. An air depolarized primary cell comprising a container, a caustic alkali electrolyte solution within said container, a cover having an aperture, and a block of porous carbonaceous material extending through said aperture and being provided with a thermoplastic seal, said block being impregnated with material to render it substantially repellent to caustic alkali electrolyte but not impervious to air, portions of said block adjacent the thermoplastic seal and designed to contact with atmospheric air being treated with one or more compounds selected from the group consisting of kerosene, light paraffin oils, turpentine, fish oils, nitrobenzene and azoxybenzene.

5. An electrode for an air depolarized cell comprising a block of porous carbonaceous material, said block being impregnated with material to render it difficultly pervious to caustic alkali electrolyte but not impervious to air, a portion of the surface of said block being treated with kerosene.

6. An electrode for an air depolarized cell comprising a block of porous carbonaceous material, said block being impregnated with material to render it difficultly pervious to caustic alkali electrolyte but not impervious to air, a portion of the surface of said block being treated with turpentine.

7. An electrode for an air depolarized cell comprising a block of porous carbonaceous material, said block being impregnated with material to render it difficultly pervious to caustic alkali electrolyte but not impervious to air, a portion of the surface of said block being treated with a mixture of kerosene and nitrobenzene in approximately equal parts.

8. An air depolarized primary cell comprising a container, a caustic alkali electrolyte solution within said container, an anode and a porous carbonaceous cathode, said cathode being so supported as to have an upper surface exposed to the air and having a portion thereof submerged in said electrolyte, said cathode being provided with at least one cavity extending downwardly from the exposed surface thereof but not substantially below the line of contact between said cathode and said electrolyte.

9. An air depolarized primary cell comprising a container, a cover for said container, a caustic alkali electrolyte solution within said container, a metallic anode and a porous carbonaceous cathode, said cathode being impregnated with a solution to render it difficultly permeable by said electrolyte but not impermeable to air, said cathode being supported in an aperture in said cover with one end exposed to the air and having a portion submerged in said electrolyte, a sealing means between the cover and the cathode and in contact with the cathode, said cathode being provided with at least one cavity extending downwardly from the surface in contact with the air to about to the level of the bottom of the sealing means.

10. An air depolarized primary cell comprising a container, a cover for said container, said cover being provided with an aperture to receive a cathode, a caustic alkali electrolyte within said cell, electrodes including a porous carbon air-depolarized cathode and an anode, immersed at least in part in said electrolyte, the cathode extending through the aperture of said cover and being sealed to said cover in said aperture by electrolyte-resistant plastic sealing means, said cathode being treated with a material to render it substantially repellent to the said electrolyte but not impervious to air, said cathode being provided with at least one cavity extending downwardly from the surface of the cathode, which extends through the aperture in said cover, to below the level of said sealing means but not substantially below the upper line of contact between said cathode and said electrolyte.

11. A cell as described in claim 10, in which the cathode contains in the region adjacent said plastic sealing means a small amount of at least one material selected from the group consisting of kerosene, liquid paraffin oils, turpentine, fish oils, nitrobenzene and azoxybenzene but not substantially below the line of contact between said cathode and said electrolyte.

ERWIN A. SCHUMACHER.
GEORGE W. HEISE.

CERTIFICATE OF CORRECTION.

Patent No. 2,207,763. July 16, 1940.

ERWIN A. SCHUMACHER, ET AL.

It is hereby certified that error appears in the printed specification of the above numbered patent requiring correction as follows: Page 2, first column, line 41, before "electrode" insert --an--; page 3, first column, line 32, for the word "threaded" read --threatened--; page 4, first column, line 33, claim 2, strike out "only"; line 38, same claim, before "submerged" insert --said--; same page, second column, lines 66 to 68, claim 11, strike out the words "but not substantially below the line of contact between said cathode and said electrolyte"; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.